J. G. McNAIR.
SHOE TREE.
APPLICATION FILED JUNE 29, 1910.
971,210.
Patented Sept. 27, 1910.
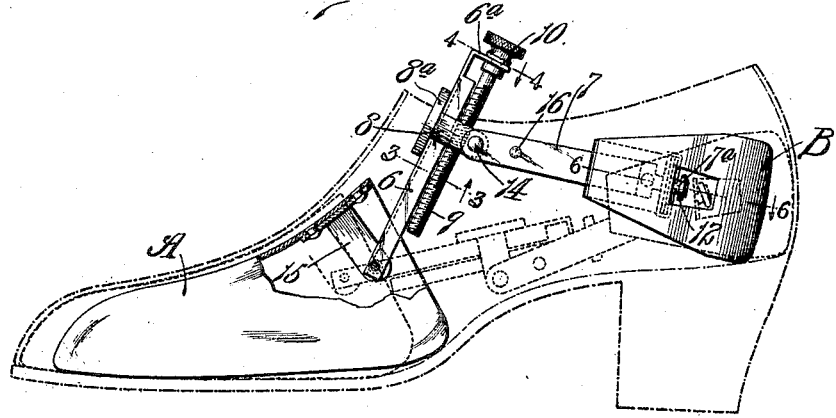
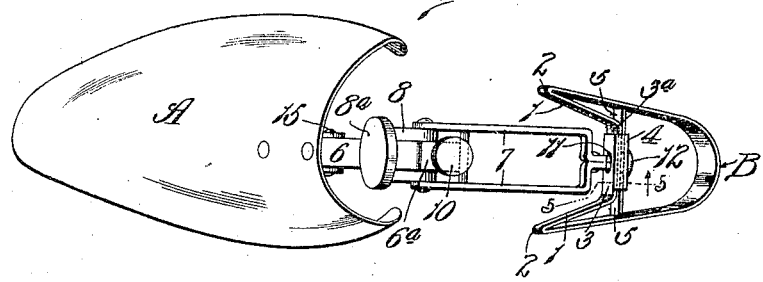
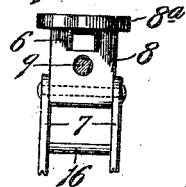
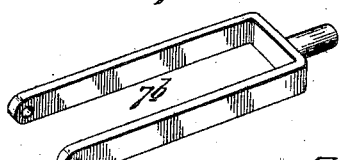
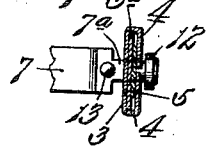
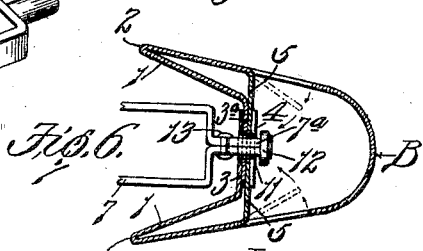
Witnesses:
Geo. R. Ladson
Wells R. Church
Inventor:
John G. McNair
By Paul Bakewell Atty.

UNITED STATES PATENT OFFICE.

JOHN G. McNAIR, OF ST. LOUIS, MISSOURI.

SHOE-TREE.

971,210.  Specification of Letters Patent.  Patented Sept. 27, 1910.

Application filed June 29, 1910. Serial No. 569,590.

*To all whom it may concern:*

Be it known that I, JOHN G. McNAIR, a citizen of the United States, residing at St. Louis, Missouri, have invented a certain new and useful Improvement in Shoe-Trees, of which the following is a full, clear, and exact description, such as will enable others skilled in the art to which it appertains to make and use the same.

This invention relates to shoe trees.

One object of the invention is to provide a strong and light-weight shoe tree that presents a neat and ornamental appearance and which can be manufactured at a low cost.

Another object is to provide a shoe tree which is so designed that it can be adjusted easily while it is arranged in the shoe.

Another object is to provide a shoe tree that can be inserted and withdrawn from the shoe easily and which is not liable to collapse or fold up after it has been arranged in operative position.

Another object is to provide a shoe tree having a heel portion which is so designed that it can be made large enough to engage practically the entire counter of the shoe and still permit a comparatively long toggle to be used for connecting the heel and toe portions of the tree together.

Other objects and desirable features of my invention will be hereinafter pointed out.

Figure 1 of the drawings is a side elevational view of a shoe tree constructed in accordance with my invention, the toe portion of the tree being broken away so as to show how the toggle is connected thereto; Fig. 2 is a top plan view of the shoe tree shown in Fig. 1; Figs. 3 and 4 are detail sectional views taken on the lines 3—3 and 4—4, respectively, of Fig. 1, looking in the directions indicated by the arrows; Fig. 5 is a vertical sectional view taken on the line 5—5 of Fig. 2, looking in the direction indicated by the arrow; Fig. 6 is a horizontal sectional view taken on the line 6—6 of Fig. 1, looking in the direction indicated by the arrow; and Fig. 7 is a perspective view of a rear toggle member of slightly different construction from the one shown in Figs. 1 and 2.

Referring to Figs. 1 to 6 of the drawings which illustrate the preferred form of my invention, A designates the toe portion of the tree which preferably consists of a sheet metal shell although if desired said toe portion could consist of a solid wooden member or a hollow cast metal member. The heel portion B of the tree is preferably formed of sheet metal and is so shaped that it will fit snugly inside of the counter of the shoe and thus hold the counter in shape. The toe portion and heel portion are connected together by a toggle which I will hereinafter describe, and the heel portion is provided adjacent its transverse center with a cross web to which one end of the toggle is connected, and also side wings 1 which project forwardly beyond said cross piece, as shown clearly in Figs. 2 and 6. In the embodiment of my invention herein shown, the heel portion B is formed from a single piece or strip of metal whose end portions are doubled at 2 and bent inwardly so as to produce side wings which are composed of two thicknesses of metal, and the extreme end portions of the strip are then bent laterally so as to produce overlapping extensions 3 and 3ª which constitute the cross web of the heel portion, the extension 3 being provided with integral arms 4 which are lapped over or wrapped around the extension 3 so as to connect the ends of the strip of metal together. To further reinforce and strengthen the heel portion B and eliminate the possibility of its bending inwardly, I have provided the sides of said heel portion with inwardly projecting braces or wings 5 that are embraced by the portions 4 of the extension 3 which are wrapped around the extension 3ª of the strip of metal from which the heel portion is formed. I do not wish it to be understood, however, that my invention is limited to a shoe tree provided with a heel portion of the exact construction herein shown for the heel portion of the tree could be modified or constructed in various other ways than herein shown without departing from the spirit of my invention. I prefer, however, to construct the heel portion B in the manner above described because such a structure is light, strong and inexpensive to manufacture, and furthermore, can be made large enough to fit practically the entire counter of the shoe.

The toggle which connects the toe portion A and the heel portion B together consists of a front member 6 and a rear member 7 and an adjustable block 8 slidingly mounted on the front member 6 and having the rear member 7 pivotally connected thereto at a point below said front member. Various means may be employed for adjusting the block 8 longitudinally of the member 6 on which it is mounted so as to vary the length of the toggle but I prefer to use a screw 9 journaled in the member 6 and passing through a screw-threaded opening in the block 8. The screw 9 is arranged on the under side of the member 6 so that only the knurled head 10 on the outer end thereof will be exposed to view when the tree is arranged in operative position in a shoe, and as the head 10 of the adjusting screw is located at approximately the center of the shoe and some distance from the bottom of the shoe when the toggle is broken or arranged in the position shown in full lines in Fig. 1 said screw can be manipulated easily. I prefer to form the front member 6 of the toggle from a piece of sheet metal pressed or drawn into substantially channel-shape in cross section, as shown in Fig. 3, so as to reduce the weight of the tree and also the cost of manufacture, and said member 6 is provided at its outer end with a bifurcated jaw 6ª which straddles or projects into a groove formed in the head 10 of the screw so as to prevent the screw from moving longitudinally when it is rotated.

The rear member 7 of the toggle is substantially yoke-shaped, and is provided at one end with a shank 7ª which projects through an opening 11 in the cross web of the heel portion B so as to swivel the heel portion on the rear member of the toggle, and said opening is made large enough to permit the heel portion to rock relatively to the member 7 and thus conform to the counter of the shoe when the toggle is straightened, as shown in broken lines in Fig. 1. After the shank 7ª of the member 7 has been inserted in the opening 11 in the cross web of the heel portion a washer 12 is placed on said shank and the end of the shank then upset so as to prevent the heel portion from slipping off the shank, but it will, of course, be obvious that the heel portion B could be swiveled on the rear member 7 of the toggle in various other ways. The rear member 7 of the toggle can either be formed from two strips of metal bent in the manner shown in Figs. 2 and 6, and connected together by a rivet 13 or in some other suitable manner, or, if desired, a single yoke-shaped casting 7ᵇ can be used for the rear member of the toggle.

The yoke-shaped member 7 embraces the block 8 and is pivotally connected thereto by a pin 14, and the front end of the front member 6 of the toggle is pivotally connected to a downwardly projecting ear 15 on the interior of the toe portion A of the tree. Said front member 6 is so shaped that it will pass between the sides of the yoke-shaped member 7 of the toggle when the toggle is straightened during the operation of arranging the tree in operative position in a shoe, and a stop 16 is arranged transversely of the member 7 so as to be engaged by the adjusting screw 9 after the toggle has passed beyond its dead center position, as shown in broken lines in Fig. 1, the toggle being securely locked after it has passed its dead center position. If desired, the adjustable block 8 can be provided with a button or finger-piece 8ª which can be grasped by the operator during the operation of straightening or breaking the toggle.

After the tree has been arranged in operative position it will be practically impossible for it to collapse or fold up for when the toggle members have passed beyond their dead center position, a positive upward pull is necessary to break the toggle or move it into the position shown in full lines in Fig. 1.

The tree is compact, light, and presents a neat and ornamental appearance, and as the head on the adjusting screw is located adjacent the center of the shoe and some distance from the sole of the shoe when the toggle is broken, said screw can be manipulated easily to vary the length of the toggle without withdrawing the tree from the shoe. By locating the cross web of the heel portion adjacent the transverse center of same I am able to use a comparatively long toggle and also make the heel portion of the tree large enough to fill practically the entire counter of the shoe and thus prevent the counter from warping or pulling out of shape as would be liable to occur if the heel portion engaged only the back of the counter.

Having thus described my invention, what I claim as new and desire to secure by Letters Patent is:

1. A shoe tree, comprising a toe portion, a heel portion formed of sheet metal and provided with side wings whose inner ends are connected together by a cross web, inwardly projecting wings on the sides of said heel portion which coöperate with said cross web to prevent the heel portion from bending inwardly, said cross web being provided with an opening, and a toggle connected to said toe portion and having a shank that passes loosely through the opening in said cross web.

2. A shoe tree, comprising a toe portion, a heel portion formed of a single piece of sheet metal bent to produce double side wings which are provided with overlapping extensions, portions on one of said extensions that lap over the other extension and thus connect the inner ends of said wings together, and a toggle connected to the toe portion and to the overlapping extensions of said wings.

3. A shoe tree, comprising a toe portion, a heel portion formed of a single piece of sheet metal bent to produce double side wings which are provided with overlapping extensions, portions on one of said extensions that lap over the other extension and thus connect the inner ends of said wings together, a toggle connected to the toe portion and to the overlapping extensions of said wings, and integral arms on the sides of said heel portions which project inwardly so that they will be embraced by the portions on said extension which lap over the extension.

4. A shoe tree comprising a toe portion, a heel portion formed of a single piece of sheet metal bent to produce doubled side wings and a transversely extending cross web composed of a plurality of thicknesses of metal, a toggle arranged between said toe and heel portions and comprising a front member of approximately channel-shape in cross section and a yoke-shaped rear member provided with a shank which passes through an opening in the cross web, an adjustable block slidingly mounted on the front member of the toggle and having the yoke-shaped member of the toggle pivotally connected thereto, and a stop on said yoke-shaped member for limiting the downward movement of the front member of the toggle during the operation of placing the tree in a shoe.

In testimony whereof I hereunto affix my signature in the presence of two witnesses, this twenty-fourth day of June 1910.

JOHN G. McNAIR.

Witnesses:
WELLS L. CHURCH,
GEORGE BAKEWELL.